Sept. 22, 1959 — F. R. QUINN — 2,904,999
LIQUID SIGHT GAUGE
Filed Oct. 7, 1955

Inventor
Frederic R. Quinn,
by Aram Boyajian
His Agent.

United States Patent Office 2,904,999
Patented Sept. 22, 1959

2,904,999

LIQUID SIGHT GAUGE

Frederic R. Quinn, Red Hook, N.Y., assignor to Quinn & Kerns, Incorporated, Red Hook, N.Y., a corporation of New York Application October 7, 1955, Serial No. 539,185

4 Claims. (Cl. 73—325)

This invention relates to improvements in a liquid sight gauge, and has for its principal objects the provision of a seal with a more reliable seal, better protected against breakage, more compact, and of lighter weight. While the invention was conceived of primarily for airborne equipment, its advantages will be appreciated for stationary equipment also.

In order to make the level or flow of a liquid in a system visible, it is customary to make a portion of the liquid-containing or liquid-conveying system of glass, while the rest would be of metal. This then involves the problems of making a reliable liquid-tight joint between the glass and the adjoining metal, and protecting the glass from the danger of breakage whether due to an impact from an external object or due to mechanical stresses set up in the adjoining parts and transmitted to the glass.

Conventional practice in the construction of such gauges is to use glass tubing with a gasket or packing at each joint between glass and metal tubing, reliance being placed generally on screw means to apply pressure between the metal and the glass to compress the gasket or packing sufficiently to produce a satisfactory tight seal. It is well known, however, that gaskets and packings have a limited life, and pressure on them sufficient to make a tight joint may damage them and also endanger the glass. Partial provision is customarily made for this by using glass tubing of a husky diameter and wall thickness.

It is a major object of the present invention, therefore, to provide a gauge with a reliable hermetic seal without resort to pressure, and to protect the glass from stresses imposed on the adjoining tubing under the usual operating conditions of the system, so that a light and compact and economical gauge may be had with unrestricted long life.

Figure 1:
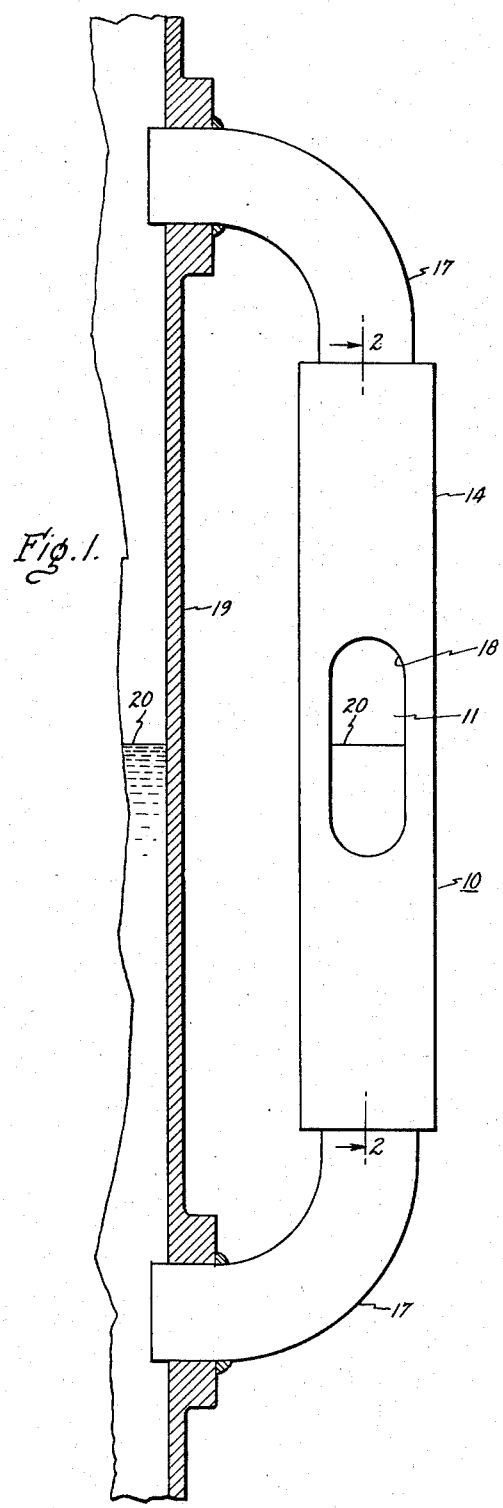
Figure 2:
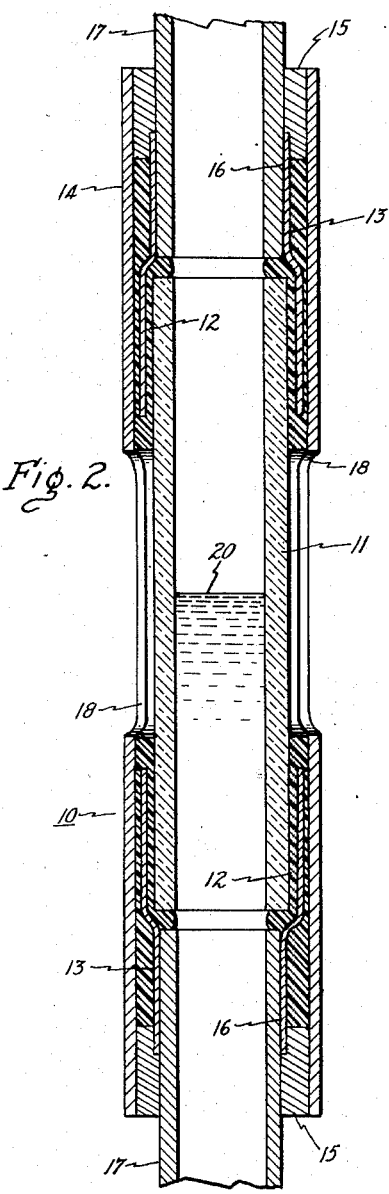

Other advantages and benefits of the invention will be apparent from the following description taken in connection with the accompanying single drawing containing two figures in which Fig. 1 is the front elevation of a gauge made in accordance to the present invention and installed on a tank shown partially in vertical cross section; and Fig. 2 is a vertical-axial-cross section of the gauge itself.

Referring to the two figures jointly, 10 is the complete gauge, adapted for installation in a liquid line, and includes a short length of glass tubing 11, joined to a metal terminal tubing 17 at each end of the glass tubing, through a thin and relatively flexible metal sleeve 13. An advantageous metal for 17 is copper, and that for 13 is steel. Part 14 is a relatively stiff protective sheath that covers the glass and the sleeve and is rigidly joined to the terminal tubing 17 at each end. A window 18 is provided in the sheath 14 to expose the liquid to inspection.

This arrangement of parts will be seen to involve three joints as follows: a joint 12 between the glass tubing 11 and the sleeve 13 at each end portion of the glass tubing; a joint 16 between each sleeve 13 and the adjoining metal tubing 17; and a joint 15 between each end of the sheath 14 and the adjoining terminal tubing 17. The last mentioned joint, 15, may extend also between 14 and 13.

Joint 12—between glass and metal—is preferably made with a plastic composition or non-brittle resinous composition compatible with the liquid involved, a layer of this composition of substantial thickness filling up the space between the glass tube and the metal sleeve as shown in Fig. 2 and adhering to them to form a yieldable hermetic seal between them and to provide strain relief. For instance, epoxy resin is found to be suitable for a variety of liquids.

Joint 16—between two metals—is preferably a soldered or brazed joint.

Joint 15—also between two metals—is also preferably a soldered or brazed joint though it may also be a plastic or resin joint. It will be seen that this joint needs primarily mechanical strength and not liquid-tightness, in view of the window cut in the sheath.

The following advantages of the construction that has been described may now be evident.

The glass tubing and the resin or plastic joint 12 are put under no pressure, and need no pressure, to make the joint a hermetic seal.

The soldered or brazed joint 16 needs no words of recommendation; and, similarly, joint 15 will be seen to be a reliable one.

In view of the fact that the sleeve 13 is of thin and relatively flexible metal, the stresses exerted on the terminal tubing 17 will be taken up practically entirely by the relatively rigid sheath 14, protecting the glass, the sleeve and the joint between the glass and the sleeve. Furthermore, it will be seen that any small fractional strains transmitted to the interior of the gauge will be accommodated by the flexible sleeve and the non-brittle plastic or resin composition, maintaining the joint intact and the glass free from dangerous stresses, good for alternate high pressures and vacuum.

While it requires no statement that the gauge may be made in various sizes, it may be of interest to observe that, for many of the common applications, these figures represent magnified views of the gauge.

In the light of the foregoing explanations of the principles, organization and structure of the invention, illustrated with the now most preferred embodiment thereof, various modifications within the spirit of the invention will occur to those skilled in the art, and I aim to include such modifications within the scope of the appended claims.

I claim:

1. The liquid sight gauge comprising a metal terminal tube at each end, a glass tube intermediate said terminal tubes, two thin and flexible metal sleeves, each one of said sleeves connecting said glass tube to one of said terminal tubes, one end of each one of said sleeves, overlapping the adjacent end of said glass tube and being joined thereto with a non-brittle glass-and-metal adhesive plastic composition adapted to provide a hermetic seal and substantial strain relief, the other end of said sleeve overlapping the adjacent end of the adjacent terminal tube and joined thereto with a fused metal hermetic seal, and a rigid protective metal sheath enclosing said glass tube and said sleeves and their joints, said sheath being rigidly attached to said terminal tubes to protect said enclosed parts from stresses between said terminal tubes, said sheath having a window to expose to view a portion of said glass tube.

2. The gauge of claim 1, said plastic composition forming a layer of substantial thickness between said sleeve and said glass tube where they overlap.

3. The sight gauge of claim 2, said adhesive composition being epoxy resin cementing said overlapping surfaces of said glass tube and said sleeve to each other.

4. The sight gauge adapted to subjection to alternate high fluid pressure and vacuum, said gauge including two rigid tubular terminal members, a glass tubular member having approximately the same inner bore as said terminal members and arranged between and in series with said terminal members, two relatively flexible sleeve members joining said glass member to said two terminal members respectively, each flexible sleeve member substantially overlapping said glass member at one end and substantially overlapping said terminal member at its other end, a rigid tubular sheath member containing a window on its side and enclosing said glass member and said sleeve members and the sleeve-enclosed ends of said terminal members, said sheath member being firmly joined to said terminal members to protect said glass and said sleeve members from stresses between said terminal members, and a relatively yielding composition filling the free spaces among said members to hermetically seal said glass, said sleeve and said terminal members to each other and to protect said glass member against high fluid pressures within said member.

References Cited in the file of this patent

UNITED STATES PATENTS

| | | |
|---|---|---|
| 2,053,765 | Dana | Sept. 8, 1936 |
| 2,620,663 | Fine | Dec. 9, 1952 |
| 2,725,844 | Wittlin | Dec. 6, 1955 |
| 2,741,498 | Elliot | Apr. 10, 1956 |